US006902360B2

(12) United States Patent
Meece et al.

(10) Patent No.: US 6,902,360 B2
(45) Date of Patent: Jun. 7, 2005

(54) METHOD OF CUTTING A HOLE IN A COMPOSITE MATERIAL WORKPIECE

(75) Inventors: Roy Dean Meece, New Trenton, IN (US); Jeffrey Kevin Back, Loveland, OH (US); Roger John Tuchfarber, Deer Park, OH (US); Gerald Roger Geverdt, Cincinnati, OH (US); Michael Jay Brunck, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 10/071,596

(22) Filed: Feb. 8, 2002

(65) Prior Publication Data

US 2003/0152432 A1 Aug. 14, 2003

(51) Int. Cl.⁷ ................................................. B23C 1/00
(52) U.S. Cl. ..................... 409/132; 409/65; 409/191; 409/143; 409/200; 269/7
(58) Field of Search ........................... 409/132, 65, 66, 409/67–70, 71, 74, 131, 191, 200, 143; 269/7

(56) References Cited

U.S. PATENT DOCUMENTS

| 3,917,249 | A | * | 11/1975 | Constantine ................. 269/58 |
| 4,352,610 | A | | 10/1982 | Yankovoy et al. |
| 4,943,191 | A | * | 7/1990 | Schmitt ....................... 408/1 R |
| 5,000,630 | A | | 3/1991 | Riley et al. |
| 5,116,174 | A | * | 5/1992 | Fried et al. .................... 409/79 |
| 5,285,598 | A | * | 2/1994 | Arita et al. .................. 408/1 R |
| 5,354,155 | A | | 10/1994 | Adams |
| 5,378,091 | A | * | 1/1995 | Nakamura ................... 409/132 |
| 5,448,041 | A | | 9/1995 | Benoit et al. |
| 5,567,198 | A | * | 10/1996 | Cook ........................... 451/384 |
| 5,641,252 | A | * | 6/1997 | Eriksson et al. ............ 409/132 |
| 5,678,962 | A | * | 10/1997 | Hyatt et al. ................... 409/66 |
| 5,685,674 | A | | 11/1997 | Taquist et al. |
| 5,816,755 | A | * | 10/1998 | Thelin ......................... 409/132 |
| 5,934,847 | A | * | 8/1999 | Thelin ......................... 409/132 |
| 6,007,281 | A | * | 12/1999 | Eriksson et al. ............. 409/132 |
| 6,196,908 | B1 | | 3/2001 | Adams |
| 6,257,810 | B1 | * | 7/2001 | Schmitt ........................ 409/66 |
| 6,258,737 | B1 | | 7/2001 | Steibel et al. |
| 6,382,890 | B1 | * | 5/2002 | Linderholm ................. 409/191 |

FOREIGN PATENT DOCUMENTS

| DE | 3106612 A1 | * | 9/1982 |
| DE | 019920365 A1 | * | 11/2000 |
| EP | 065247 A1 | * | 11/1982 |
| EP | 307823 A2 | * | 3/1989 |
| GB | 2048135 A | * | 12/1980 |
| JP | 4-53645 A | * | 2/1992 |
| WO | WO-94/14944 A1 | * | 8/1994 |

OTHER PUBLICATIONS

Tool and Manufacturing Engineers Handbook, 4th ed., vol. 1, Machining, SME, 1983, pp. 10–50–10–61 and 12–114.*

* cited by examiner

Primary Examiner—Erica Cadugan
(74) Attorney, Agent, or Firm—McNees Wallace & Nurick LLC

(57) ABSTRACT

A hole of a hole size is cut in a composite material workpiece by selecting a milling cutter having an effective cutter size less than the hole size, mounting the composite material workpiece in operable relation to the milling cutter, rotating the milling cutter about an axis of rotation, and advancing the milling cutter longitudinally into the composite material workpiece parallel to the axis of rotation at a rate of longitudinal advance, while laterally moving the milling cutter perpendicular to the axis of rotation to interpolate the hole. The rate of longitudinal advance is controlled such that the hole remains substantially a flat-bottomed hole as it is cut. The composite material workpiece is desirably affixed to a backing fixture with an adhesive material during the cutting of the hole.

20 Claims, 4 Drawing Sheets

METHOD OF CUTTING A HOLE IN A COMPOSITE MATERIAL WORKPIECE

This invention relates to the cutting of holes and, more particularly, to cutting holes in a composite material.

BACKGROUND OF THE INVENTION

The cutting of a hole into a workpiece is a commonly performed machining operation. The development of drills, lubricants, and related techniques for metallic workpieces for hole drilling has been ongoing.

Fiber composite materials are formed of fibers embedded into a matrix, wherein the individual phases retain their respective characters in the composite material. These materials offer good mechanical properties coupled with light weight and are therefore used in a number of aircraft-related applications. Examples of such fiber composite materials are organic-matrix composites such as carbon fibers in an epoxy matrix; metal-matrix composites such as boron fibers in an aluminum-alloy matrix; and ceramic-matrix composites such as silicon carbide fibers in a silicon/silicon carbide matrix, termed a silicon carbide/silicon carbide composite material.

The cutting of holes in such composite materials is often difficult for a number of reasons. The fibers and the matrix usually have different mechanical properties, so that the cutting process is not uniform. The fibers and/or the matrix may be hard and difficult to cut. The anisotropy in the structure may also contribute to difficulty in cutting and also to irregularity of the shape of the hole and its positioning. There is a tendency for the fibers to debond from the matrix as the hole is drilled, so that there is splintering and fraying of the composite material on the sides of the drilled hole and at the front and back faces of the workpiece. This splintering and fraying reduces the mechanical properties of the composite material and can lead to crack initiation and premature failure of the composite material.

A number of techniques have been proposed to drill holes in composite materials. These techniques are operable to varying degrees, but none has been found fully satisfactory in cutting holes in certain types of composite materials such as ceramic-matrix composite materials. There is accordingly a need for an improved approach to the cutting of holes in composite materials. The present invention fulfills this need, and further provides related advantages.

SUMMARY OF THE INVENTION

The present invention provides a method for cutting a hole in a composite material workpiece. The approach may be used with a wide variety of composite materials, but its benefits are particularly advantageous when the approach is used to cut holes in ceramic-matrix composite materials. The splintering and fraying of the composite material is minimal at the sides of the hole and at the front and back faces of the composite material workpiece. The cut hole is precisely positioned and sized, even when the composite material workpiece is compliant, easily deformed, and/or curved.

A method for cutting a hole of a hole size in a composite material workpiece comprises the steps of providing the composite material workpiece, selecting a milling cutter having an effective cutter size less than the hole size, and mounting the composite material workpiece in operable relation to the milling cutter. The present approach is preferably used with a ceramic matrix composite material workpiece, such as a silicon carbide/silicon carbide composite material workpiece. The hole is typically but not necessarily cylindrical and the milling cutter is cylindrical with a cylindrical diameter, the effective cutter size in this case, less than the diameter of the hole.

The cutting includes rotating the milling cutter about an axis of rotation, and advancing the milling cutter longitudinally into the composite material workpiece parallel to the axis of rotation at a rate of longitudinal advance, while laterally moving the milling cutter perpendicular to the axis of rotation to interpolate the hole. The hole may be a blind hole or a through hole. Desirably, the rate of longitudinal advance is controlled such that the hole remains substantially a flat-bottomed hole of substantially constant depth over its area as it is cut.

The above described approach forms the desired hole in the composite material workpiece. Positional accuracy, hole shape, and hole size may be improved by providing a backing fixture, and affixing the composite material workpiece to the backing fixture with an adhesive material. A preferred adhesive material is a thermosetting adhesive such as a thermosetting epoxy. The composite material workpiece has a front face to which the milling cutter is first contacted and an oppositely disposed back face. Preferably, the backing fixture has a shape conformed to the back face of the composite material workpiece. For example, if the back face of the composite material workpiece is nonplanar, the backing fixture has a nonplanar surface that conforms to the shape and size of the back face. Thus, in this approach the composite material is not clamped in place with discrete mechanical clamps. When this fixturing technique is used, the composite material workpiece is removed from the backing fixture after the hole is cut.

The present approach allows the cutting of precisely positioned, sized, and shaped holes into a composite material workpiece, with minimal splintering and fraying at the front face of the workpiece, the sides of the hole, and the back face of the workpiece. It also allows non-cylindrical holes to be readily cut, inasmuch as the hole shape is determined by the path of interpolation, not the shape of the milling cutter.

The size and shape of the hole are not determined by the diameter of the milling cutter. Any size of milling cutter may be used to cut a hole, as long as the diameter of the milling cutter is smaller than the size of the hole and fits into recesses or corners of the hole. The size and shape of the hole are also unaffected by wear of the milling cutter, inasmuch as the pattern of the interpolation may be adjusted, as by radial offsets, to compensate for any reduction in the diameter of the milling cutter as it wears. The latter advantage is important for the cutting of holes in composite materials, because of the high rate of wear of the cutting tool in many types of composite materials. As a result of these advantages, hole tolerances in composite materials may be typically held to within +/−0.001 inch.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
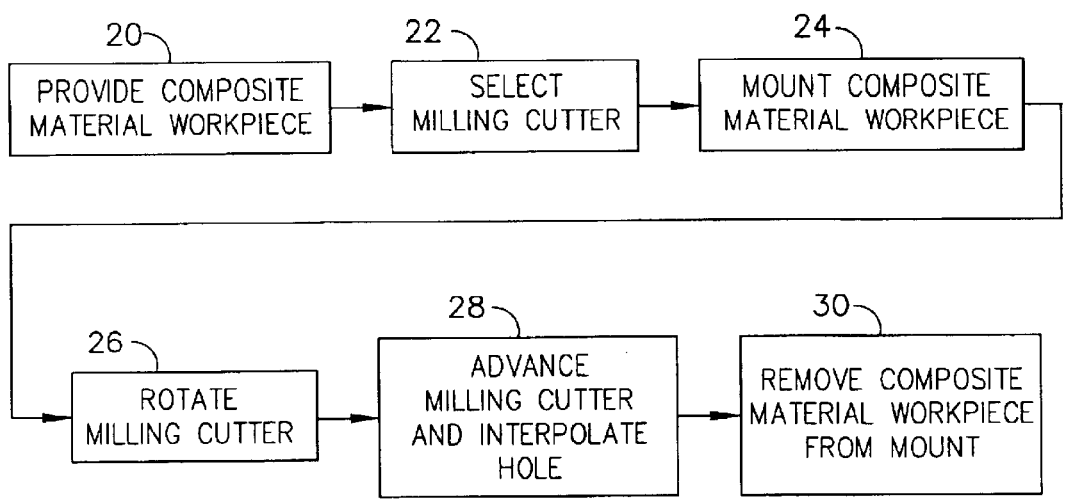
FIG. 1 is a block diagram of a method for cutting holes in a workpiece.
Figure 2:
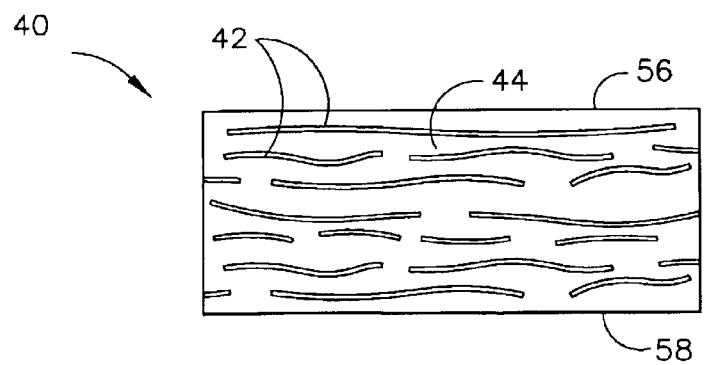
FIG. 2 is an idealized microstructure of one form of a composite material workpiece.

FIG. 1 depicts a preferred approach for practicing the present invention. A composite material workpiece is provided, numeral 20. The present approach is justified only for composite materials, and the use of monolithic (non composite) workpieces is excluded. FIG. 2 illustrates one form of a composite material workpiece 40 having fibers 42 embedded in a matrix 44. In this case, the fibers 42 are unidirectionally oriented in a single dimension, but they may be oriented in two or three dimensions. The fibers 42 may have other orientations as well, such as random orientation. In all cases, the material of the fibers 42 remains distinct from the material of the matrix, so that there are at least two separate phases visible in the microstructure of the composite material.

The composite material workpiece may be of any operable type, but it is preferably a ceramic-matrix composite material wherein the matrix 44 is a nonmetallic, nonorganic, ceramic phase. The brittle ceramic matrix 44 of such composite materials is highly susceptible to damage and failure by splintering, fraying, and/or cracking when conventional hole-drilling techniques are used. The ceramic-matrix composite material is most preferably a silicon carbide/silicon carbide composite material workpiece 40 having the silicon carbide fibers 42 embedded in the silicon/silicon carbide matrix 44. Such a silicon carbide/silicon carbide composite material is known in the art and is described, for example, in U.S. Pat. No. 6,258,737, whose disclosure is incorporated by reference, and other patents referenced therein.

The silicon carbide/silicon carbide composite material is advantageously employed in hot-section portions of an aircraft gas turbine engine in applications such as a generally cylindrical thin-walled combustor liner. In such applications, however, it is necessary to have precisely positioned holes through the wall of the combustor liner for access by fuel injectors, ignitors, and the like. The present approach is utilized to cut such holes into the composite material workpiece. Typically, the composite material workpiece is provided in its generally final overall configuration, but without the holes that are cut as described below.

Figure 3:
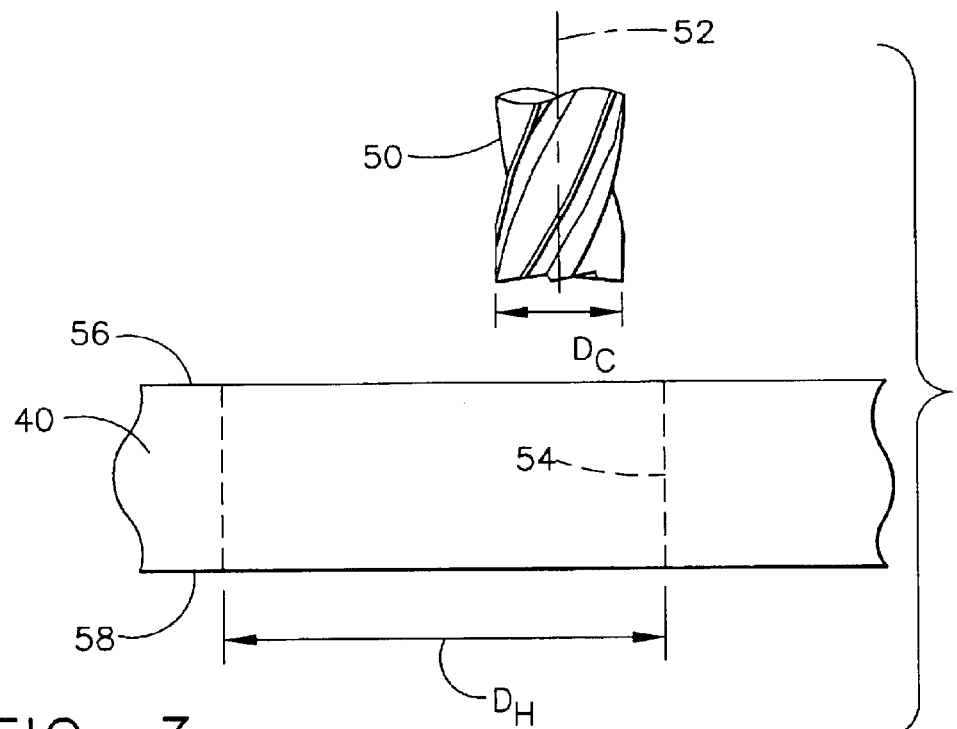
FIG. 3 is an elevational view of a milling cutter in relation to the size of the hole to be cut.

A milling cutter 50 is selected, numeral 22. The milling cutter 50 has an effective (i.e., the size over which it has an effect) transverse cutter size less than the transverse hole size. The milling cutter 50 has an axis of rotation 52 about which it is rotated, as shown in FIG. 3. The transverse cutter size is measured perpendicular to the axis of rotation 52. In the usual case, the milling cutter 50 is generally cylindrically symmetric and the axis of rotation is coincident with the cylindrical axis, so that the transverse cutter size is a cutter cylindrical diameter $D_C$. The milling cutter 50 is oriented relative to the composite material workpiece 40 to cut (drill) a hole 54 in the composite material workpiece 40. The transverse hole size is also measured perpendicular to the axis of rotation 52 when the milling cutter 50 and composite material workpiece are in this relative orientation. In the usual case, the desired hole 54 is cylindrical with a hole diameter $D_H$. $D_H$ is always greater than $D_C$. However, the hole need not be cylindrical and may be of other shapes, as long as its smallest transverse dimension is greater than $D_C$.

The milling cutter 50 may be of any operable type for use with the particular material of the composite material workpiece 40. For cutting silicon carbide/silicon carbide composite material, it is preferred that the milling cutter is PCD (polycrystalline diamond) Diamond Compac and/or Diamond Mesh with a grit size on the order of about 80–120. Cutting may be performed dry, without a lubricant or coolant, in order to avoid any contamination of the workpiece. A lubricant or coolant may instead be used where appropriate.

The composite material workpiece 40 is mounted in a position for accomplishing the cutting of the hole, numeral 24 of FIG. 1. The composite material workpiece 40 may be mounted in any operable fashion. However, it has been found that typical clamps and comparable fixturing tend to distort the composite material workpiece 40 during the hole cutting procedure. When the composite material workpiece is taken out of the clamp or conventional fixture after the hole is cut, the workpiece relaxes to its original shape so that the hole in the final relaxed form of the composite material workpiece is mispositioned, not of the desired shape, and/or not of the desired size.

Figure 4:
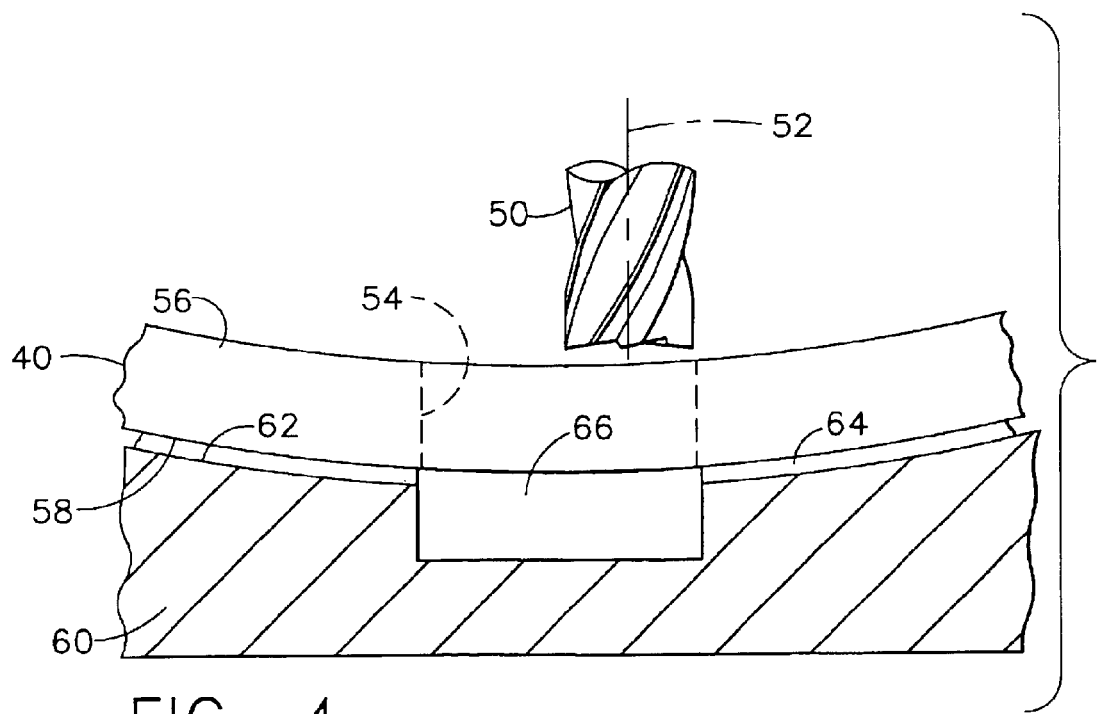
FIG. 4 is a schematic view of a preferred approach for mounting the composite material to a backing fixture.

FIG. 4 illustrates a preferred mounting approach that avoids these undesired results. The composite material workpiece 40 has a front face 56 that is first contacted by the milling cutter 50 when the hole 54 is cut, and a back face 58. The back face 58 may be flat as in FIG. 3, or curved as in FIG. 4. A backing fixture 60 is provided, desirably with a shape of a fixture face 62 conformed to the back face 58 of the composite material workpiece 40. That is, the fixture face 62 has a shape and size so that the back face 58 may be placed onto the fixture face 62 with a close conformation therebetween, without substantially deforming the composite material workpiece 40. Where the back face 58 is planar, the fixture 60 and its fixture face 62 are preferably planar; where the back face 58 is nonplanar, the fixture 60 and its fixture face 62 are preferably nonplanar and shaped to match the shape of the back face 58. The composite material workpiece 40 is affixed to the fixture face 62 of the backing fixture 60 with a layer 64 of an adhesive material. The adhesive layer 64 is preferably a thermoplastic adhesive such as a thermoplastic epoxy, so that the composite material workpiece 40 may be later removed from the backing fixture 60 by heating the thermoplastic adhesive to a temperature above its softening point. The fixture face 62 may be provided with a relief 66 in registry with the location where the hole 54 is to be cut into the composite material workpiece 40, so that the milling cutter 50 does not cut into the backing fixture 60 when a through hole is drilled.

The milling cutter 50 is mounted in a drive, comparable with a milling machine. The milling cutter 50 is then rotated about its axis of rotation 52, numeral 26 of FIG. 1.

Figure 5:
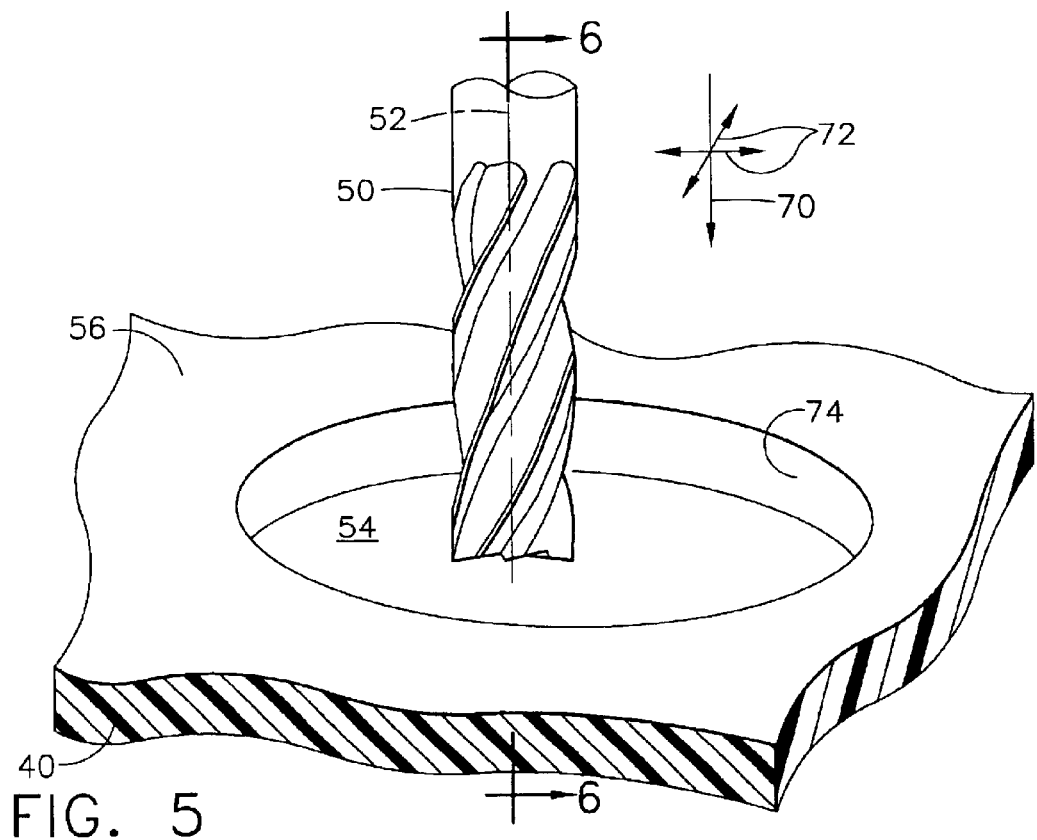
FIG. 5 is a schematic perspective view of the milling cutter as it cuts the hole in the composite material workpiece.
Figure 6:
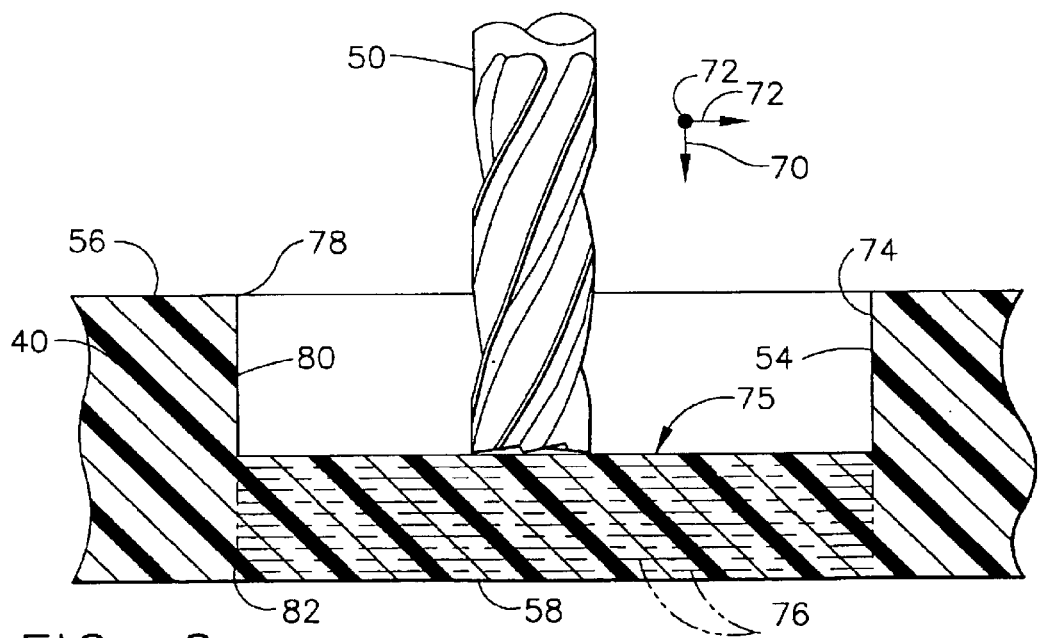
FIG. 6 is a schematic sectional view taken on line 6—6 of FIG. 5.

The rotating milling cutter 50 is advanced longitudinally into the composite material workpiece 50 parallel to the axis of rotation 52 at a rate of longitudinal advance, while laterally moving the milling cutter 50 perpendicular to the axis of rotation 52 to interpolate the hole 54. FIGS. 5–6 illustrate the cutting process. The milling cutter 50 is moved in an advance direction 70 parallel to the axis of rotation 52 and into the composite material workpiece 40. At the same time, the milling cutter is moved in a lateral direction 72 perpendicular to the advance direction 70 to remove material to define a periphery 74 of the hole 54 and the remainder of a surface 75 at the bottom of the hole 54, a processing termed "interpolating". The lateral direction 72 comprises all directions lying in a plane perpendicular to the advance direction 70. Because the diameter of the milling cutter 50 is less than the transverse size of the hole 54, such an interpolation process is necessary to machine the entire hole 54.

The rate of longitudinal advance is controlled such that the hole 54 has a substantially constant depth over its entire area as it is cut in the step 28. That is, the hole 54 is substantially flat bottomed on the surface 75 as illustrated in FIG. 6. Alternatively stated, the material that is removed to form the hole 54 may be visualized for discussion purposes as a series of stacked laminae 76 (even though the composite material workpiece 40 is not necessarily physically laminar in nature), each of which has a thickness much less than the thickness of the composite material workpiece between the front face 56 and the back face 58. The laminae 76 are visualized as being stacked parallel to the front face 56. The milling cutter 50 is moved in the advance direction 70 so that each lamina 76 is removed substantially in its entirety over the entire area of the hole 54, before the next lamina is removed. This gradual removal of the material at the bottom of the hole 54 may be accomplished by holding the milling cutter 50 at a constant position relative to the advance direction 70 and moving it in the lateral directions 72 to define the periphery 74 of the hole 54. It may instead be accomplished by moving the milling cutter 50 relatively slowly in the advance direction 70 while moving it in the lateral direction 72 as well. In the description, the milling cutter 50 is described as moving relative to the stationary composite material workpiece 40, but the relative movement may instead be accomplished by a movement of the composite material workpiece 40 relative to milling cutter 50, or by a combination of the two movements.

This approach to removing the composite material to define the hole 54 advantageously acts upon only a very thin laminar region of the composite material when the periphery 74 of the hole 54 is being cut. The cutting forces and distance over which they are applied to the composite material at the periphery 74 are small. This small force and small application distance reduce the tendency of the composite material at the periphery 74 to splinter, fray, and/or crack. The result is an excellent surface finish, with reduced tendency to splinter, fray, and/or crack, at an entrance point 78 where the milling cutter 50 first penetrates the front face 56 along what is eventually the hole periphery 74, along the sides 80 of the hole 54, and at an exit point 82 where the milling cutter 50 breaks through the back face 58 to define the periphery 74 of the hole 54 at the back face 58. The entrance point 78 and the exit point 82 are subject to such splintering, fraying, and/or cracking when conventional hole drilling techniques are used in relation to many composite materials, particularly the ceramic-matrix composite materials. As is apparent from the depiction of the laminar approach, the hole 54 may be either a blind hole where the laminae are not all removed through the entire thickness of the composite material workpiece and leaving the surface 75 at the bottom of the hole 54, or a through hole where the milling cutter 50 penetrates through the entire thickness of the composite material workpiece.

After the hole 54 is cut, the composite material workpiece 40 is removed, numeral 30 of FIG. 1, from the backing fixture 60 in the preferred approach. Where the thermoplastic adhesive layer 64 is used, the removal step 30 is readily accomplished by heating the adhesive layer 64 to a temperature above its softening temperature and mechanically separating the composite material workpiece 40 from the backing fixture 60.

Figure 7:
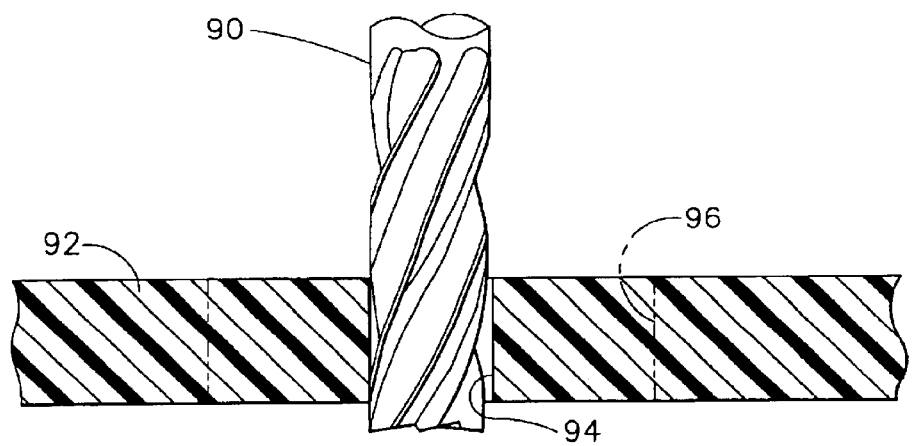
FIG. 7 is a schematic illustration of a drilling approach not within the scope of the present approach.

The present approach is to be contrasted with alternatives that are not within the scope of the invention, such as that illustrated in FIG. 7. Here, a bit 90 is used to first drill entirely through a composite material workpiece 92 to define an initial through hole 94. If the hole is to be larger than the diameter of the bit 90, the bit 90 is thereafter moved laterally to create a larger hole 96. In this case, greater damage to the composite material at the periphery of either hole 94 or 96 is experienced, because the material removal forces applied at the periphery of the hole 94 or 96 are large and applied over a large distance at any moment.

The present approach has been reduced to practice and found operable for cutting holes in silicon carbide/silicon carbide composite materials. A number of other approaches were tried. Alternative approaches such as twist drills, spiral drills, and end mills of the same diameter as the hole to be cut produced unacceptable results due to splintering and fraying at the entry surface and/or the exit surface of the hole, or excessive tool wear.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for cutting a hole of a hole size in a composite material workpiece, the method comprising the steps of:
   providing the composite material workpiece;
   selecting a milling cutter having an effective cutter size less than the hole size;
   mounting the composite material workpiece in operable relation to the milling cutter;
   rotating the milling cutter about an axis of rotation; and
   advancing the milling cutter longitudinally into the composite material workpiece parallel to the axis of rotation at a rate of longitudinal advance, while laterally moving the milling cutter perpendicular to the axis of rotation to interpolate the hole, and while maintaining the hole substantially flat bottomed as the milling cutter advances.

2. The method of claim 1, wherein the step of providing includes the step of
   providing a ceramic matrix composite material workpiece.

3. The method of claim 1, wherein the step of providing includes the step of
   providing a silicon carbide/silicon carbide composite material workpiece.

4. The method of claim 1, wherein the step of mounting includes the steps of
   providing a backing fixture, and
   affixing the composite material workpiece to the backing fixture with an adhesive material.

5. The method of claim 4, wherein the step of affixing includes the step of
   affixing the composite material workpiece to the backing fixture with a thermoplastic adhesive material.

6. The method of claim 4, including an additional step, after the step of advancing, of removing the composite material workpiece from the backing fixture.

7. The method of claim 1, wherein the step of advancing includes the step of
controlling the rate of longitudinal advance such that the hole remains substantially flat-bottomed as it is cut.

8. The method of claim 1, wherein the hole is cylindrical with a hole diameter, and wherein the step of selecting includes the step of
selecting the miller cutter to be cylindrical with an effective cutter diameter less than the hole diameter.

9. The method of claim 1, wherein the step of advancing includes the step of
advancing the milling cutter longitudinally into the composite material workpiece less than a thickness of the composite material workpiece, thereby forming a blind hole.

10. The method of claim 1, wherein the step of advancing includes the step of
advancing the milling cutter longitudinally into the composite material workpiece by at least a thickness of the composite material workpiece, thereby forming a through hole.

11. A method for cutting a hole of a hole size in a composite material workpiece, the method comprising the steps of:
providing the composite material workpiece;
selecting a milling cutter having an effective cutter size less than the hole size;
mounting the composite material workpiece in operable relation to the milling cutter wherein the step of mounting includes the steps of
providing a backing fixture, and
affixing the composite material workpiece to the backing fixture with an adhesive material;
rotating the milling cutter about an axis of rotation;
advancing the milling cutter longitudinally into the composite material workpiece parallel to the axis of rotation at a rate of longitudinal advance, while laterally moving the milling cutter perpendicular to the axis of rotation to interpolate the hole, the step of advancing including the step of controlling the rate of longitudinal advance such that the hole has a substantially constant depth over its entire area as it is cut; and, after the hole is completed,
removing the composite material workpiece from the backing fixture.

12. The method of claim 11, wherein the step of providing includes the step of
providing a ceramic matrix composite material workpiece having a brittle ceramic matrix.

13. The method of claim 11, wherein the step of providing includes the step of
providing a silicon carbide/silicon carbide composite material workpiece.

14. The method of claim 11, wherein the composite material workpiece has a front face to which the milling cutter is first contacted and an oppositely disposed back face, and wherein the step of providing the backing fixture includes the step of
providing the backing fixture having a shape conformed to the back face of the composite material workpiece.

15. The method of claim 14, wherein the step of providing the backing fixture includes the step of
providing a nonplanar backing fixture.

16. The method of claim 11, wherein the step of affixing includes the step of
affixing the composite material workpiece to the backing fixture with a thermoplastic adhesive material.

17. The method of claim 11, wherein the hole is cylindrical with a hole diameter, and wherein the step of selecting includes the step of
selecting the miller cutter to be cylindrical with an effective cutter diameter less than the hole diameter.

18. The method of claim 11, wherein the step of advancing includes the step of
advancing the milling cutter longitudinally into the composite material workpiece less than a thickness of the composite material workpiece, thereby forming a blind hole.

19. The method of claim 11, wherein the step of advancing includes the step of
advancing the milling cutter longitudinally into the composite material workpiece by at least a thickness of the composite material workpiece, thereby forming a through hole.

20. A method for cutting a hole of a hole size in a composite material workpiece, the method comprising the steps of:
providing a ceramic-matrix composite material workpiece having fibers embedded in a brittle ceramic matrix,
selecting a milling cutter having an effective cutter size less than the hole size;
mounting the composite material workpiece in operable relation to the milling cutter wherein the step of mounting includes the steps of
providing a backing fixture, and
affixing a back face of the composite material workpiece to the backing fixture;
rotating the milling cutter about an axis of rotation; and
advancing the milling cutter longitudinally into the composite material workpiece parallel to the axis of rotation at a rate of longitudinal advance from a front face of the composite material workpiece toward the back face, while laterally moving the milling cutter perpendicular to the axis of rotation to interpolate the hole, and while maintaining the bole substantially flat-bottomed as the milling cutter advances.

* * * * *

UNITED STATES PATENT AND TRADEMARK OFFICE
CERTIFICATE OF CORRECTION

PATENT NO. : 6,902,360 B2
DATED : June 7, 2005
INVENTOR(S) : Meece et al.

It is certified that error appears in the above-identified patent and that said Letters Patent is hereby corrected as shown below:

Column 7,
Line 6, "fiat-bottomed" should be -- flat-bottomed --.

Column 8,
Line 55, "bole" should be -- hole --.

Signed and Sealed this

Fourteenth Day of February, 2006

JON W. DUDAS
*Director of the United States Patent and Trademark Office*